Dec. 16, 1947.   M. W. BLOOM   2,432,653

SPRING TINE MOUNTING

Filed Sept. 16, 1944

Inventor
Merle W. Bloom by K. S. Wyman
Attorney

Patented Dec. 16, 1947

2,432,653

UNITED STATES PATENT OFFICE 2,432,653

SPRING TINE MOUNTING

Merle W. Bloom, Maywood, Ill., assignor to Allis-Chalmers Manufacturing Company, Milwaukee, Wis., a corporation of Delaware Application September 16, 1944, Serial No. 554,422

5 Claims. (Cl. 56—400)

This invention relates to agricultural and other types of machines, implements and the like embodying one or more spring-tine carrying members functionally arranged in any desired manner of which but one example is the reel assembly of a side delivery rake.

In prior constructions, a practical mounting of spring-tine elements on reel bars and the like has heretofore been generally such as to necessitate removing the bar from the reel or other support therefor in order to replace those tine elements which have worn out or become broken. Consequently, with the practical constructions heretofore known replacement of the tine elements requires considerable time and effort, is at times difficult, and in all cases the structure being serviced must remain idle for an objectionable length of time.

It is therefore the object of this invention to provide an improved, practical spring-tine mounting for reel bars and other members which permits the tine elements to be severally, readily secured to and removed from the support therefor with a minimum of time and effort, which affords an effective support for the coil portion or portions of the tine element during both tedding and raking operations, and which affords a simplified, durable and inexpensive construction.

The construction of a spring-tine mounting in accordance with this invention will become readily apparent as the disclosure progresses and particularly points out characterizing features considered of special importance and of general application.

Accordingly, the invention may be considered as consisting of the various details of construction, combinations of elements and arrangements of parts as is more fully set forth in the appended claims and in the detailed description, reference being had to the accompanying drawing, in which:

Figures 1, 2:
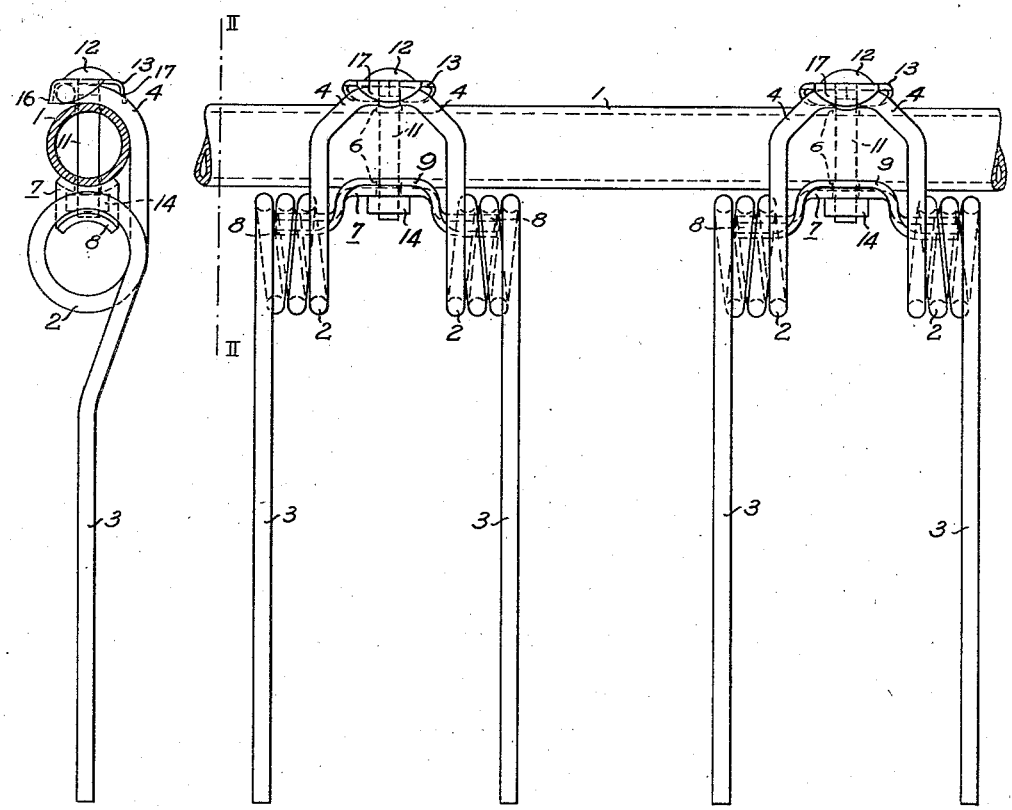
Fig. 1 is a partial front elevation of a rake reel bar embodying the invention.
Fig. 2 is a view taken on line II—II of Fig. 1.

Referring to the drawing, it is seen that the invention may be applied to a tubular reel bar member or the like 1 and to dual toothed spring-tine elements including a pair of spaced opposed coil portions 2, a tooth portion 3 extending from the outer side of each coil portion, and a loop portion 4 uniting the coil portions 2 and extending away therefrom preferably in an opposite direction with respect to tooth portions 3; the outer extremity or mid-section of loop portion 4 being preferably bent or otherwise shaped to engage the top side of tubular member 1 with coil portions 2 disposed in spaced adjacent parallel relation with respect to the opposite or underside of member 1 as is best indicated in Figs. 1 and 2.

Figure 3:
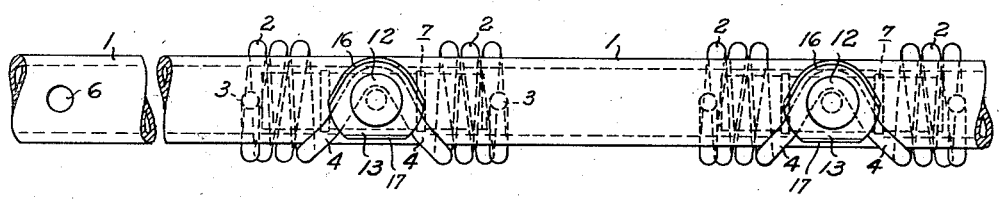
Fig. 3 is a top plan view of the structure shown in Fig. 1.

Member 1 is provided with a series of longitudinally spaced pairs of alined holes or bolt receiving bores 6 and the spring-tine elements are readily detachably secured to member 1 by means of a part 7 having oppositely extending end portions 8 supportingly disposed within coil portions 2 and an offset, apertured intermediate portion 9 adapted to engage the underside of member 1 with the aperture therein alined with a pair of bolt receiving bores 6 and by a carriage bolt part or element 11 having a head portion 12 engaged by loop portion 4 as is best indicated in Fig. 3 with its opposite or nut engaging end projecting through the aperture in the offset portion 9 of part 7.

The head portion of part 11 is preferably provided with a removable washer element or the like 13 shaped to nonrotatably engage and retain loop portion 4 in firm engagement with the upper side of member 1 and the offset portion 9 of part 7 is preferably shaped to present an upper surface complementary to the underside of member 1 as is best shown in Fig. 2. Likewise, the end portions 8 of part 7 are preferably shaped to conform with the inner peripheral surface of coil portions 2. In this connection, it should be particularly noted (see Fig. 2) that the combined height of the end and offset portions of part 7 is less than the inner diameter of coil portions 2 thereby permitting part 7 to be inserted and withdrawn through either coil portion to and from a position in which its offset portion 9 is disposed between coil portions 2 with its end portions 8 supporting same.

Figures 4, 5:
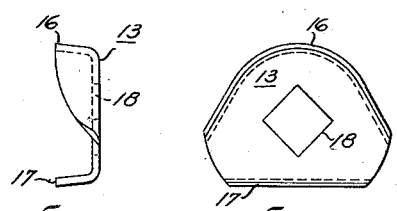
Fig. 4 is a plan view of the tine loop engaging washer element.
Fig. 5 is a side elevation of the washer element shown in Fig. 4.

In assembling the spring-tine element on a reel bar member or the like, the element may be positioned against member 1 with loop portion 4 surrounding a bore 6 therein whereupon parts 7, 13 and 11 may then be assembled in the order named, or if desired, part 7 may be first inserted through a coil portion 2, that is, before the spring-tine element is positioned on member 1. In either case, all that has to be done after insertion of part 11 in order to detachably securely unite the various parts in the relation shown is to apply a nut 14 to the lower exposed end of part 11 and tighten same thereon which can be readily accomplished since, as best shown in Figs. 4 and 5, washer 13 is provided with offset portions 16 and 17 which prevent a turning of the washer relative to loop portion 4 and with a square bolt hole 18 which in turn prevents rotation of the carriage bolt part 11 when the nut is tightened thereon. Obviously, whether the loop or fastening portion of the spring-tine element and the parts 7 and 11 are shaped to engage diametrically opposed exterior surface portions of a tubular member or merely different and preferably spaced surface portions or sides of a tubular or other shaped member is a matter of selection and may be varied as desired.

This type of mounting affords all of the advantages with respect to strength and durability present in prior constructions in which a reel bar member or the like passes through and suitably supports the coil portion or portions of the spring-tine element mounted thereon during both tedding and raking operations, and in addition, affords a greater degree of flexing or spring action and permits the tine elements to be severally secured to and removed from the supporting member with a minimum of time and effort.

The invention is applicable to various types of spring-tine supported elements and although certain correlations of features are peculiar to spring-tine elements including spaced opposed coil portions and a uniting loop portion, other features are of more general application, and it should therefore be understood that it is not desired to limit the invention to the exact details of construction and correlations of features herein shown and described for purposes of illustration as various modifications within the scope of the appended claims may occur to persons skilled in the art.

It is claimed and desired to secure by Letters Patent:

1. In combination with a rake reel bar member or the like, a spring-tine element having a coil terminating in tooth and fastening portions extending from the coil in generally opposite directions, said fastening portion being in engagement with one side of said member with said coil disposed adjacent a generally opposite side thereof, a rigid part having one portion affording a rigid support for said coil and having an offset portion in engagement with the side of said member adjacent said coil, and means detachably securing the offset portion of said part and the fastening portion of said element in firm engagement with generally opposite sides of said member.

2. In combination with a rake reel bar member or the like, a spring-tine element having a coil terminating in tooth and fastening portions extending from the coil in generally opposite directions, said fastening portion being in engagement with one side of said member with said coil disposed in spaced non-supported relation to a generally opposite side of said member, a rigid part having one portion affording a rigid support for said coil and having an offset portion in engagement with the side of said member adjacent said coil, and means detachably securing the offset portion of said part and the fastening portion of said element in firm engagement with generally opposite sides of said member.

3. In combination with a rake reel bar or like member, a spring-tine element having a pair of spaced opposed coils, a tooth portion extending from each coil and a loop portion uniting the coils, a rigid part having end portions disposed within and affording rigid support for the coils and having an offset intermediate portion in engagement with said member, said part being insertable and removable through at least one of said coils to and from a position in which said intermediate portion is disposed between said coils with the end portions of said part supporting said coils, and means detachably securing an intermediate section of said loop portion and the intermediate portion of said part to generally opposite sides of said member with the coil supporting end portions of said part disposed longitudinally of the member in generally parallel relation with respect to the adjacent side thereof.

4. In combination with a rake reel bar or like member, a spring-tine element having a pair of spaced opposed coils, a tooth portion and a loop portion extending from each coil in generally opposite directions, said loop portions being integrally joined in a fastening portion uniting said coils, said fastening portion being in engagement with one side of said member and said coils being disposed in spaced unsupported relation to a generally opposite side of said member, a rigid part having end portions disposed within and affording rigid support for said coils and having an offset intermediate portion in engagement with said member, said part being insertable and removable through either of said coils to and from a position in which the offset portion of said part is disposed between said coils with the end portions of said part rigidly supporting said coils, and means detachably securing said fastening portion and said offset portion to said member.

5. In combination with a rake reel bar member or the like, a spring-tine element having a pair of spaced opposed coils, a tooth portion extending from each coil, a loop portion uniting said coils, said loop portion comprising a pair of straight portions and a fastening portion in engagement with one side of said member with said coils disposed in spaced unsupported relation to a generally opposite side of said member, said tooth portions extending in one direction and said straight portions extending in a generally opposite direction, a rigid part having and affording rigid supports for said coils and having an intermediate offset portion in engagement with said opposite side, said part being insertable and removable through either of said coils to and from a position in which the intermediate portion of said part is disposed between said coils with the end portions of said part rigidly supporting said coils, and means including a bolt detachably securing the intermediate portion of said part and the fastening portion of said coils to opposite sides of said member, the longitudinal axis of said bolt being substantially parallel to the longitudinal axis of said tooth portions.

MERLE W. BLOOM.

REFERENCES CITED

The following references are of record in the file of this patent:

UNITED STATES PATENTS

| Number | Name | Date |
|---|---|---|
| 2,171,025 | Crumb et al. | Aug. 29, 1939 |
| 2,364,303 | Martin | Dec. 5, 1944 |
| 1,358,481 | Traphagen | Nov. 9, 1920 |
| 2,237,002 | Kelley | Apr. 1, 1941 |